US011078027B2

(12) United States Patent
Kasai et al.

(10) Patent No.: US 11,078,027 B2
(45) Date of Patent: Aug. 3, 2021

(54) ALIGNING AND FEEDING DEVICE

(71) Applicant: QUALICAPS CO., LTD., Yamatokoriyama (JP)

(72) Inventors: Kenichi Kasai, Yamatokoriyama (JP); Kenji Fujita, Yamatokoriyama (JP)

(73) Assignee: QUALICAPS CO., LTD., Yamatokoriyama (JP)

( * ) Notice: Subject to any disclaimer, the term of this patent is extended or adjusted under 35 U.S.C. 154(b) by 0 days.

(21) Appl. No.: 16/635,799

(22) PCT Filed: Jul. 23, 2018

(86) PCT No.: PCT/JP2018/027490
§ 371 (c)(1),
(2) Date: Jan. 31, 2020

(87) PCT Pub. No.: WO2019/035318
PCT Pub. Date: Feb. 21, 2019

(65) Prior Publication Data
US 2021/0039894 A1    Feb. 11, 2021

(30) Foreign Application Priority Data

Aug. 17, 2017 (JP) .............................. JP2017-157401

(51) Int. Cl.
*B65G 47/14* (2006.01)
*B65G 47/84* (2006.01)
(52) U.S. Cl.
CPC ..... *B65G 47/1428* (2013.01); *B65G 47/1464* (2013.01); *B65G 47/848* (2013.01); *B65G 2201/027* (2013.01); *B65G 2811/0626* (2013.01)

(58) Field of Classification Search
CPC ............ B65G 47/1407; B65G 47/1414; B65G 47/1428; B65G 47/1435; B65G 47/1457; B65G 47/1464; B65G 47/848
See application file for complete search history.

(56) References Cited

U.S. PATENT DOCUMENTS 3,960,293 A * 6/1976 Sweet, II ........... B65G 47/1457
                                                     221/258
5,044,487 A    9/1991 Spatafora et al.
5,400,893 A * 3/1995 Spatafora ................ B65B 35/46
                                                     198/392

FOREIGN PATENT DOCUMENTS

JP    S62-60713 A    3/1987
JP    S62-157117 A    7/1987
(Continued)

*Primary Examiner* — William R Harp
(74) *Attorney, Agent, or Firm* — Muncy, Geissler, Olds & Lowe, P.C.

(57) ABSTRACT

An aligning and conveying apparatus includes a rotating disk having a bottom wall, a first ring having a first circumferential wall, a second ring having a second circumferential wall. First and second conveying parts are respectively provided in upper parts of the first and second circumferential walls. In the rotating disk and the first ring, the bottom wall is positioned lower than the first conveying part to form a retaining space for retaining preparations inside the first ring. The respective rotational axes are relatively inclined such that the preparations move from the bottom wall to the first conveying part at a first delivery position. In the first and second rings, the first conveying part is positioned lower than the second conveying part, and the respective rotational axes are relatively inclined such that the preparations move from the first conveying part to the second conveying part at a second delivery position.

7 Claims, 4 Drawing Sheets

(56) References Cited

FOREIGN PATENT DOCUMENTS

JP        H03-102009 A     4/1991
JP        2002-347921 A    12/2002

\* cited by examiner

ALIGNING AND FEEDING DEVICE

TECHNICAL FIELD

The present invention relates to an aligning and conveying apparatus and, more specifically, relates to an aligning and conveying apparatus for conveying solid preparations such as tablets and capsules in an aligned state.

BACKGROUND ART

As a conveying apparatus for conveying target objects in an aligned state, a rotary conveying apparatus that utilizes the rotary action of a rotating disk and a rotating ring has been proposed to date. For example, Patent Literature 1 discloses a parts feeder including a rotating disk and a rotating container having a circumferential wall for accommodating the rotating disk inside, wherein conveyance targets such as screws and ribs are aligned into an upright state and conveyed. This parts feeder includes a guide member securely provided so as to surround the circumferential wall while providing a parts conveying gap between the guide member and the circumferential wall, and driving means for independently driving the rotating disk and the rotating container around the respective axes. The rotating disk and the circumferential wall are disposed in a relatively inclined manner such that the outer circumferential edge of the rotating disk and the upper edge of the circumferential wall are substantially in contact at one point. The driving means rotate the rotating disk and the rotating container such that the circumferential wall is rotated at a higher speed than the rotating disk is.

The above parts feeder accommodates the conveyance targets in the depressions formed by the rotating disk and the circumferential wall and rotates the rotating disk and the rotating container around the respective axes, and accordingly the conveyance targets move in the outer circumferential direction of the rotating disk by the centrifugal force resulting from the rotation of the rotating disk and slide on the inner circumferential surface of the circumferential wall. Thereafter, the conveyance targets are transferred to the upper edge of the circumferential wall at a position where the outer circumferential edge of the rotating disk and the upper edge of the circumferential wall are in contact, and further move radially outward by the centrifugal force resulting from the rotation of the circumferential wall, enter the parts conveying gap, and are aligned and conveyed along the circumferential wall.

CITATION LIST

Patent Literature

Patent Literature 1: JP 62-157117A

SUMMARY OF INVENTION

Technical Problem

In the above conventional parts feeder, when the rotating disk is rotated at high speed to increase the conveying speed, the conveyance targets receive a large centrifugal force and may collide with the circumferential wall. On the other hand, when only the rotating container is rotated at high speed, the difference between the speed of the rotating disk and the speed of the rotating container is increased, thus the frictional force that the conveyance targets receive from the inner circumferential surface of the circumferential wall is increased, and the orientation of the conveyance targets during conveyance may be disrupted.

For this reason, with the above conventional parts feeder, the conveyance targets are likely damaged, and it is difficult to efficiently align and convey the conveyance targets, when the conveyance targets are solid preparations such as tablets or capsules.

Therefore, an object of the present invention is to provide an aligning and conveying apparatus capable of efficiently aligning and conveying preparations while suppressing damage to the preparations.

Solution to Problem

The object of the present invention is achieved by an aligning and conveying apparatus comprising:

a rotating disk having a disk-shaped bottom wall and supported so as to be rotatable;

a first ring having a first circumferential wall surrounding the bottom wall and supported so as to be rotatable;

a second ring having a second circumferential wall surrounding the first circumferential wall and supported so as to be rotatable; and driving means for independently rotating the rotating disk, the first ring, and the second ring around respective rotational axes, wherein a first conveying part and a second conveying part are respectively provided in upper parts of the first circumferential wall and the second circumferential wall, in the rotating disk and the first ring, the bottom wall is positioned lower than the first conveying part so as to form a retaining space for retaining preparations inside the first ring, and the respective rotational axes are relatively inclined such that the preparations move from the bottom wall to the first conveying part at a first delivery position, and in the first ring and the second ring, the first conveying part is positioned lower than the second conveying part, and the respective rotational axes are relatively inclined such that the preparations move from the first conveying part to the second conveying part at a second delivery position.

In the aligning and conveying apparatus, the first conveying part preferably comprises an upper end surface of the first circumferential wall, a radially outer side of the first circumferential wall being covered by an inner wall surface of the second circumferential wall, and the second conveying part preferably comprises a cut part having a shape obtained by circumferentially cutting off a radially inner side of an upper end surface of the second circumferential wall.

The aligning and conveying apparatus preferably further comprises a suction roller for adsorbing the preparations conveyed by the second conveying part onto an outer circumferential surface and rotationally conveying the preparations. In this configuration, the second ring is preferably disposed such that the rotational axis extends vertically, and the suction roller is preferably disposed such that the rotational axis extends substantially horizontally. It is preferable that a cover for covering a more upstream side in a rotational direction of the second ring than the suction roller is securely provided above the second conveying part.

The rotational speed of the first ring is preferably set so as to be higher than a rotational speed of the rotating disk and lower than a rotational speed of the second ring.

The first ring can be composed of a plurality of concentrically disposed separate rings having separate circumferential walls. In this configuration, respective rotational axes adjacent inside and outside are relatively inclined, and the first conveying part is composed of upper parts of the respective separate circumferential walls, the rotational axis of the radially innermost separate ring is inclined relative to the rotational axis of the rotating disk, and the rotational axis of the radially outermost separate ring is inclined relative to the rotational axis of the second ring. The rotational speeds of the plurality of separate rings are preferably set so as to be increased from the innermost side toward the outermost side.

Advantageous Effects of Invention

The aligning and conveying apparatus of the present invention is capable of efficiently aligning and conveying preparations while suppressing damage to the preparations.

DESCRIPTION OF EMBODIMENTS

Figure 1:
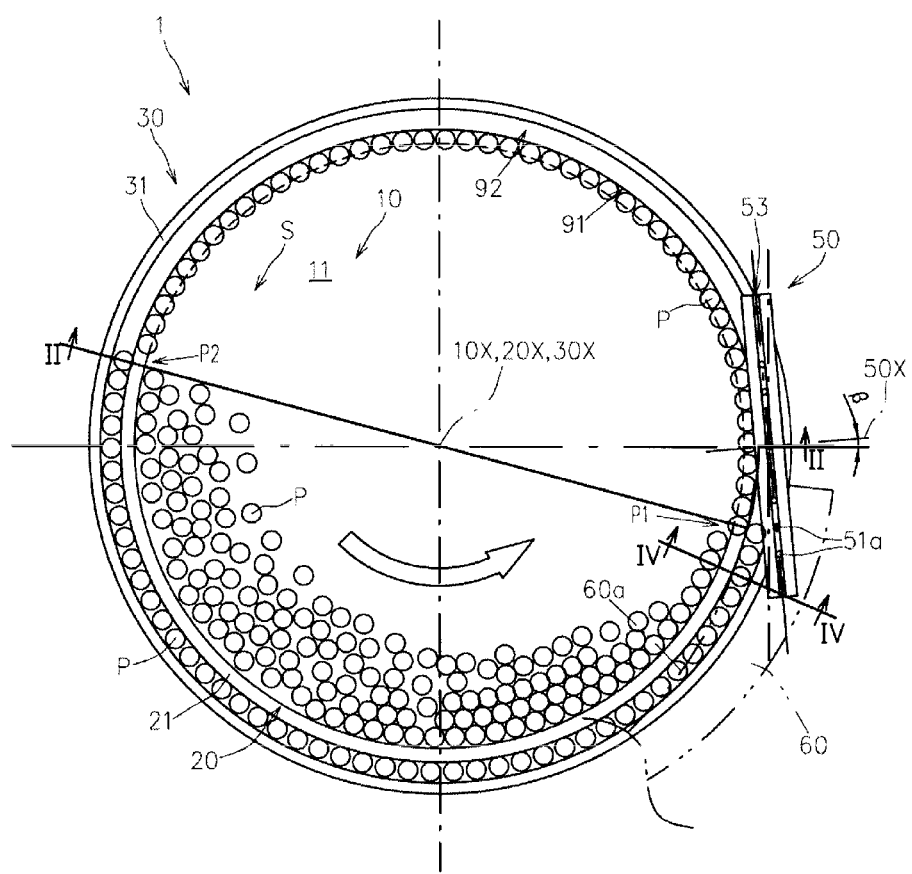
FIG. 1 is a plan view of an aligning and conveying apparatus according to one embodiment of the present invention.
Figure 2:
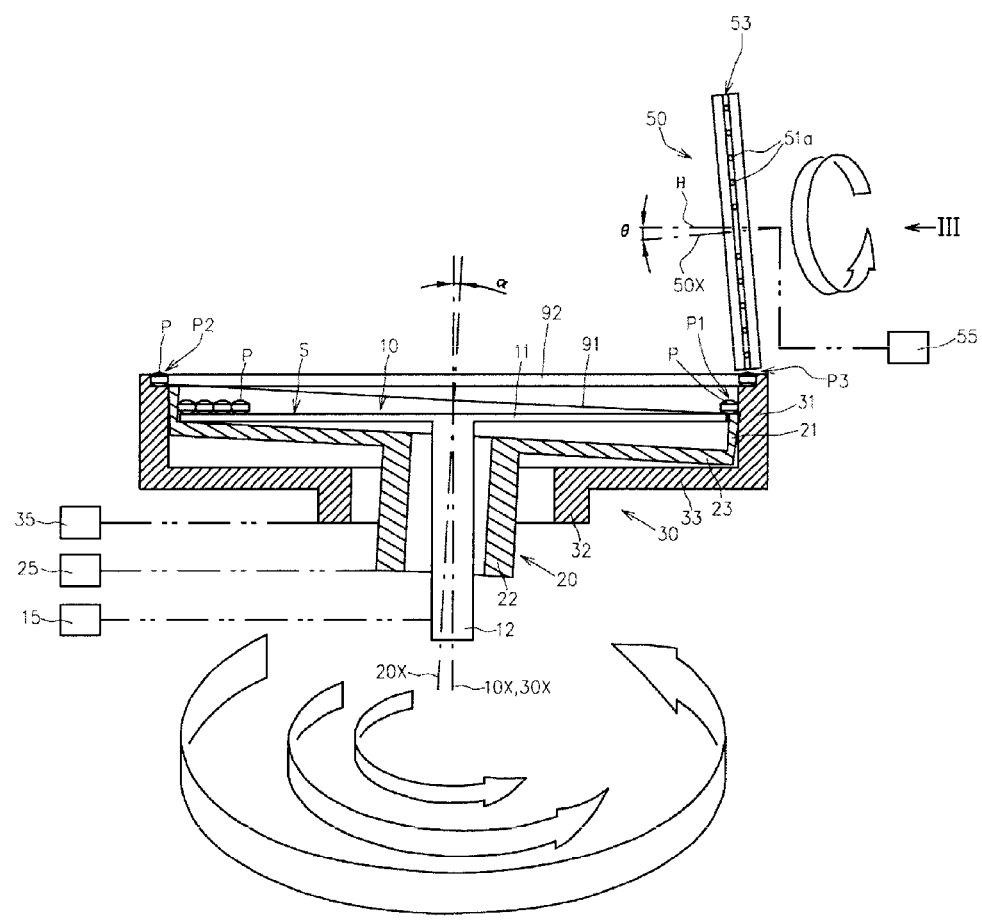
FIG. 2 is a vertical cross-sectional view taken along the line II-II of the aligning and conveying apparatus shown in FIG. 1.

Below, one embodiment of the aligning and conveying apparatus of the present invention will now be described with reference to the appended drawings. FIG. 1 is a plan view of an aligning and conveying apparatus according to one embodiment of the present invention. FIG. 2 is a vertical cross-sectional view taken along the line II-II of the aligning and conveying apparatus shown in FIG. 1.

An aligning and conveying apparatus 1 is an apparatus for conveying preparations P in an aligned state, and is used, for example, to align and convey the preparations P to an inspecting apparatus, a marking apparatus, or the like. The preparations P are, for example, solid preparations such as tablets and capsules.

As shown in FIG. 1 and FIG. 2, the aligning and conveying apparatus 1 includes a rotating disk 10 having a disk-shaped bottom wall 11 and supported so as to be rotatable around a rotational axis 10X of the bottom wall 11; a first ring 20 having a first circumferential wall 21 surrounding the bottom wall 11 and supported so as to be rotatable around a rotational axis 20X of the first circumferential wall 21; a second ring 30 having a second circumferential wall 31 surrounding the first circumferential wall 21 and supported so as to be rotatable around a rotational axis 30X of the second circumferential wall 31; and driving devices 15, 25, and 35 for independently rotating the rotating disk 10, the first ring 20, and the second ring 30 around the respective rotational axes 10X, 20X, and 30X. In the present embodiment, the rotational axes 10X, 30X are disposed so as to overlap with each other.

A first conveying part 91 and a second conveying part 92 for circumferentially conveying the preparations P in an aligned state are respectively provided in the upper parts of the first ring 20 and the second ring 30. The first conveying part 91 is composed of the upper end surface of the cylindrical first circumferential wall 21, the radially outer side of which is surrounded by the inner wall surface of the second circumferential wall 31, and the radial width of the first circumferential wall 21 is determined such that the preparations P are arranged into a single line in the circumferential direction. The second conveying part 92 is composed of a cut part having a shape obtained by circumferentially cutting off the radially inner side of the upper end surface of the cylindrical second cylindrical wall 31, the radial width of the cut part is determined such that the preparations P are arranged into a single line in the circumferential direction, and the second conveying part 92 holds the lower side and the radially outer side of the preparations P.

In the rotating disk 10 and the first ring 20, the bottom wall 11 is positioned below the first conveying part 91 so as to form a retaining space S, in which the preparations P can be retained, inside the first ring 20; and the respective rotational axes 10X, 20X are relatively inclined such that, at a first delivery position P1, the bottom wall 11 is substantially at the same height as the first conveying part 91, and the preparations P can be transferred. In the first ring 20 and the second ring 30, the first conveying part 91 is positioned lower than the second conveying part 92, and the respective rotational axes 20X, 30X are relatively inclined such that, at a second delivery position P2, the first conveying part 91 and the second conveying part 92 are substantially at the same height, and the preparations P can be transferred. The first delivery position P1 and the second delivery position P2 are point-symmetric with respect to the rotational axis 10X as viewed from above, and the second delivery position P2 is provided at a position reached by rotating the first delivery position P1 180° around the rotational axis 10X.

As shown in FIG. 2, the rotating disk 10 includes a shaft part 12 extending vertically downward from the center of the bottom wall 11 along the rotational axis 10X, and the shaft part 12 is rotated by the driving device 15. The first ring 20 includes a lower lid 23 covering the lower part of the first circumferential wall 21 and a shaft part 22 extending downward from the center of the lower lid 23 along the rotational axis 20X, and the shaft part 22 is rotated by the driving device 25. The shaft part 22 is a hollow shaft, and the shaft part 12 of the rotating disk 10 is inserted therein. The rotational axis 20X of the first ring 20 is inclined at an angle α with respect to the rotational axis 10X of the bottom wall 11. An excessively small angle α likely makes it difficult to align the preparations P in the first conveying part 91, and an excessively large angle α likely makes it difficult to convey the preparations P by the first conveying part 91. Accordingly, the angle α is, for example, preferably 1 to 20°.

The rotational axis 10X of the rotating disk 10 is not necessarily disposed vertically, and may be inclined with respect to the vertical direction. When the rotational axis 10X of the rotating disk 10 is inclined with respect to the vertical direction, the rotational axis 20X of the first ring 20 may be disposed vertically, or may be disposed so as to be inclined in the direction same as or opposite to the direction of inclination of the rotational axis 10X with respect to the vertical direction.

The second ring 30 includes a lower lid 33 covering the lower part of the second circumferential wall 31 and a shaft part 32 extending vertically downward from the center of the lower lid 33 along the rotational axis 30X, and the shaft part 32 is rotated by the driving device 35. The shaft part 32 is a hollow shaft, and the shaft part 22 of the first ring 20 is inserted therein. The rotational axis 30X of the second ring 30 is inclined at the angle α with respect to the rotational axis 20X of the first ring 20.

The rotational axis 30X of the second ring 30 is not necessarily disposed vertically, and may be inclined with respect to the vertical direction. When the rotational axis 30X of the second ring 30 is inclined with respect to the vertical direction, the rotational axis 20X of the first ring 20 may be disposed vertically, or may be disposed so as to be inclined in the direction same as or opposite to the direction of inclination of the rotational axis 30X with respect to the vertical direction.

The driving devices 15, 25, and 35 are composed of, for example, electric motors or the like, and rotate the rotating disk 10, the first ring 20, and the second ring 30 in the same direction. In the present embodiment, the rotational speed of the first ring 20 is set so as to be higher than the rotational speed of the rotating disk 10 and lower than the rotational speed of the second ring 30. Preferably, the rotational speed of the first ring 20 is set so as to be higher than the rotational speed of the rotating disk 10 and lower than 1.5 times the rotational speed of the rotating disk 10, and the rotational speed of the second ring 30 is set so as to be higher than the rotational speed of the first ring 20 and lower than 1.5 times the rotational speed of the first ring 20.

As shown in FIG. 1 and FIG. 2, the aligning and conveying apparatus 1 further includes a suction roller 50 for adsorbing the preparations P conveyed by the second conveying part 92 onto the outer circumferential surface to rotationally convey the preparations P A rotational axis 50X is disposed substantially horizontally such that the outer circumferential surface faces the second conveying part 92 from above at a third delivery position P3, and the suction roller 50 is rotated by a suction roller driving device 55. A groove 53 is circumferentially formed in the outer circumferential surface of the suction roller 50, and a large number of suction ports 51a are circumferentially formed in the entirety of the bottom part of the groove 53. As shown in FIG. 2, the rotational axis 50X may be slightly inclined toward the bottom wall 11 with respect to a horizontal direction H such that the outer circumferential surface of the suction roller 50 faces the radially outer side of the second conveying part 92 at the third delivery position P3, and thereby the preparations P can be securely adsorbed. For example, this inclination angle θ (see FIG. 2) is preferably greater than 0° and less than 20°. The second delivery position P2 and the third delivery position P3 are preferably apart from each other at least half the circumferential length of the second ring 30 such that the preparations P conveyed by the second conveying part 92 are reliably aligned and stably oriented. Preferably, the rotational speeds of the suction roller 50 and the second ring 20 are set such that the rotational speed of the suction roller 50 is higher than the rotational speed of the second ring 20.

Figure 3:
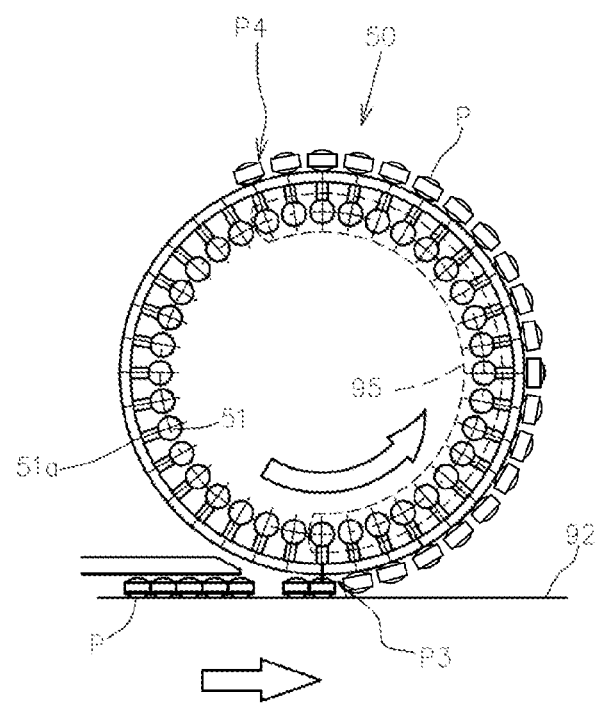
FIG. 3 is a schematic cross-sectional view when the aligning and conveying apparatus shown in FIG. 2 is viewed in the direction of the arrow III.

FIG. 3 is a schematic cross-sectional view of the suction roller 50 shown in FIG. 2 as viewed in the direction of arrow III. The suction roller 50 is rotated such that the conveying direction at the third delivery position P3 matches the conveying direction of the second conveying part 92. The suction ports 51a of the suction roller 50 are in communication with suction paths 51, the suction paths 51 during travelling through a suction shoe 95 are sucked by a vacuum suction device (not shown), and thus the preparations P are sucked and retained on the outer circumferential surface of the suction roller 50. A fourth delivery position P4 is provided above the suction roller 50, and the suction shoe 95 is formed such that the preparations P are sucked and conveyed from the third delivery position P3 to the fourth delivery position P4. At the fourth delivery position P4, the preparations P are transferred to another suction roller (not shown) or the like, and conveyed to the conveying destination.

As shown in FIG. 1, the outer circumferential surface of the suction roller 50 is disposed substantially parallel with the tangential direction of the second ring 30 at the third delivery position P3 as viewed from above. The rotational shaft 50X of the suction roller 50 may be slightly inclined with respect to the radial direction of the second ring 30 such that the more downstream side in the rotational direction of the outer circumferential surface of the suction roller 50 than the third delivery position P3 faces the inner side of the second ring 30, and thereby the preparations P at the third delivery position P3 can be reliably adsorbed. This inclination angle β (see FIG. 1) is, for example, preferably greater than 0° and less than 20°.

As shown in FIG. 1, a cover 60 for covering the more upstream side in the rotational direction of the second ring 30 than the suction roller 50 is securely provided above the second conveying part 92. The cover 60 is disposed such that an edge 60a projects immediately above the second conveying part 92 from the radially outer side toward the inner side of the second ring 30, and is configured such that the projecting width of the edge 60a immediately above the second conveying part 92 gradually increases in the rotational direction of the second ring 30. According to this configuration, the preparations P conveyed in an inappropriate orientation by the second conveying part 92 move radially inward along the edge 60a and return to the bottom wall 11, and thus only the preparations P in an appropriate orientation can be reliably conveyed.

Figure 4:
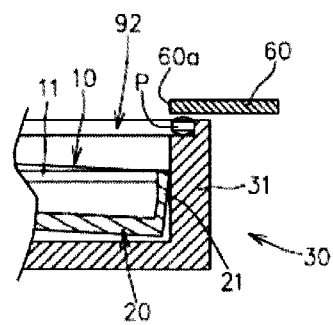
FIG. 4 is a vertical cross-sectional view taken along the line IV-IV of the aligning and conveying apparatus shown in FIG. 1.

FIG. 4 is a vertical cross-sectional view taken along the line IV-IV of the aligning and conveying apparatus shown in FIG. 1. A slight gap is provided between the cover 60 and the preparations P conveyed by the second conveying part 92.

Next, the operation of the aligning and conveying apparatus 1 will now be described. The preparations P introduced into the retaining space S formed by the rotating disk 10 and the first ring 20 receive centrifugal force resulting from the rotation of the rotating disk 10, and move toward the radially outer side of the bottom wall 11 and move from the first delivery position P1 to the first conveying part 91 in an aligned state. When the preparations P conveyed by the first conveying part 91 reach the second delivery position P2, the preparations P move from the first conveying part 91 to the second conveying part 92 by receiving centrifugal force resulting from the rotation of the first ring 20. When the preparations P conveyed by the second conveying part 92 reach the third delivery position P3, the preparations P are adsorbed by the suction roller 50 and conveyed to the fourth delivery position P4. In this way, the alignment and conveyance of the preparations P are performed.

The aligning and conveying apparatus 1 of the present embodiment is configured so as to sequentially convey the preparations P by the rotating disk 10 having the bottom wall 11, the first ring 20 having the first circumferential wall 21 surrounding the bottom wall 11, and the second ring 30 having the second circumferential wall 32 surrounding the first circumferential wall 21, and thus the conveying speed of the preparations P by the bottom wall 11 can be increased in a stepwise manner by each of the first ring 20 and the second ring 30. Accordingly, it is not necessary to rotate the bottom wall 11 at an excessively high speed to efficiently align and convey the preparations P furthermore it is not necessary to excessively increase the difference between the speeds of the bottom wall 11, the first ring 20, and the second ring 30, and therefore the second ring 30 can be rotated at a higher speed than that in conventional apparatuses while preventing the centrifugal force and frictional force acting on the preparations P from becoming excessive. Also, the number of places where the speed difference is created is increased in this way, the preparations P accumulated into a mass are likely loosened, and thus the preparations P can be efficiently aligned and conveyed at high speed while suppressing damage to the preparations P.

Moreover, since the first conveying part 91 is composed of the first circumferential wall 21, the radially outer side of which is covered by the inner wall surface of the second circumferential wall 31, and the second conveying part 92 is composed of a cut part having a shape that is obtained by circumferentially cutting off the radially inner side of the upper end surface of the second circumferential wall 31, the preparations P conveyed by the first conveying part 91 and the second conveying part 92 is in such a state that the radially inner side and the upper side of the preparations P in the cross-section of the conveying path are always open. Accordingly, there is no possibility that the preparations P when being conveyed are brought into a constrained, e.g., clogged, state, and thus the preparations P can be reliably aligned and conveyed without being damaged. Also, the preparations P are not constrained as described above and move from the rotating disk 10 to the second conveying part 92 via the first conveying part 91 by centrifugal force, thereby an aligning effect resulting from the difference between the rotational speeds of the rotating disk 10, the first ring 20, and the second ring 30 is exerted on the preparations P, and thus the preparations P can be stably conveyed in an aligned state at high speed.

Moreover, the second conveying part 92 is formed by the cut part of the second ring 30, and no frictional force is exerted on the preparations P during conveyance by the second conveying part 92. Accordingly, damage resulting from friction to the preparations P can be prevented, also there is no possibility of lateral rotation of the preparations P resulting from friction with a fixed guide or the like, and thus poor alignment of the preparations P can be reliably prevented. Such effects are more significant when the second conveying part 92 is rotated at high speed.

Since the preparations P conveyed by the second conveying part 92 are removed by being adsorbed onto the outer circumferential surface of the suction roller 50, the preparations P can be also transferred at the delivery position P3 without being damaged.

Figure 5:
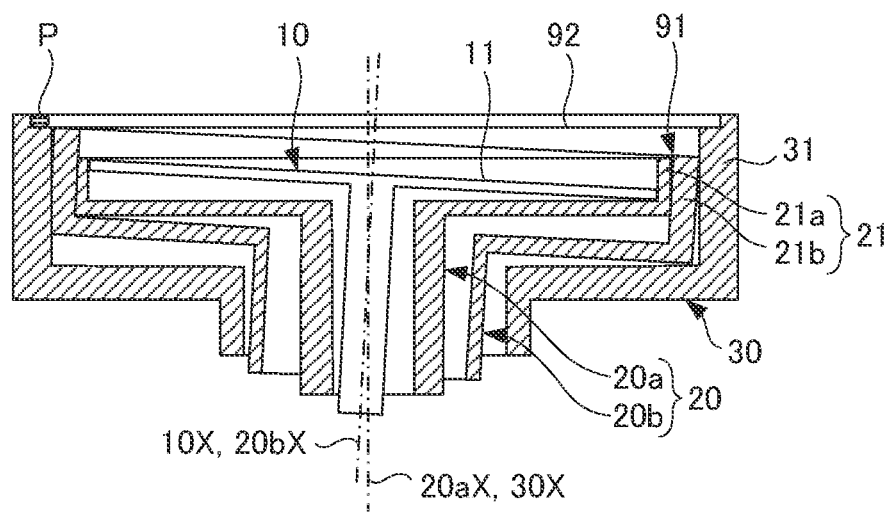
FIG. 5 is a vertical cross-sectional view of an essential part of an aligning and conveying apparatus according to another embodiment of the present invention.

One embodiment of the present invention has been described in detail above, but the specific aspects of the present invention are not limited to the above embodiment. For example, while the first ring 20 is a single component in the above embodiment, the first ring 20 may be formed by concentrically placing a plurality of separate rings 20a, 20b having separate circumferential walls 21a, 21b that are cylindrically formed as with the first circumferential wall 21 as shown in FIG. 5. The plurality of separate rings 20a, 20b may be placed such that the respective rotational axes 20aX, 20bX adjacent inside and outside are relatively inclined, and thus the first conveying part 91 can be formed by the upper parts of the respective separate circumferential walls 21a, 21b. Each separate ring 20a, 20b is independently driven by a driving device.

In this configuration, the rotational axis 20aX of the radially innermost separate ring 20a is inclined with respect to the rotational axis 10X of the rotating disk 10, and the rotational axis 20bX of the radially outermost separate ring 20b is inclined with respect to the rotational axis 30X of the second ring 30. The preparations P move from the rotating disk 10 to the radially innermost separate ring 20a, sequentially move through the first conveying part 91 composed of the separate rings 20a, 20b from the radially inner side toward the outer side, and are transferred to the second conveying part 92.

The rotational speeds of the plurality of separate rings 20a, 20b are preferably set so as to be increased from the innermost side toward the outermost side, and more preferably the difference between the speeds of the adjacent inner and outer separate rings 20a, 20b is set so as to be smaller than 1.5 times.

This modification makes it possible to create a suitable difference between the rotational speeds of the plurality of separate rings 20a, 20b constituting the first ring 20 in addition to the difference between the rotational speeds of the first ring 20 and the second ring 30. Accordingly, the conveying speed by the second conveying part 92 can be readily increased, and thus the speed of aligning and conveying the preparations P can be further increased.

REFERENCE SIGNS LIST

1 Aligning and conveying apparatus
10 Rotating disk
10X Rotational axis
11 Bottom wall
15 Driving device
20 First ring
20X Rotational axis
21 First circumferential wall
25 Driving device
30 Second ring
30X Rotational axis
31 Second circumferential wall
35 Driving apparatus
50 Suction roller
60 Cover
60a Edge
91 First conveying part
92 Second conveying part
P Preparation
P1 First delivery position
P2 Second delivery position
P3 Third delivery position
P4 Fourth delivery position
S Retaining space

The invention claimed is:

1. An aligning and conveying apparatus comprising:
a rotating disk having a disk-shaped bottom wall and supported so as to be rotatable;
a first ring having a first circumferential wall surrounding the bottom wall and supported so as to be rotatable;
a second ring having a second circumferential wall surrounding the first circumferential wall and supported so as to be rotatable; and
driving means for independently rotating the rotating disk, the first ring, and the second ring around respective rotational axes,
wherein
a first conveying part is provided in an upper part of the first circumferential wall, and a second conveying part is provided in an upper part of the second circumferential wall, in the rotating disk and the first ring, the bottom wall is positioned lower than the first conveying part so as to form a retaining space for retaining preparations inside the first ring, and the respective rotational axes are relatively inclined such that the preparations move from the bottom wall to the first conveying part at a first delivery position, in the first ring and the second ring, the first conveying part is positioned lower than the second conveying part, and the respective rotational axes are relatively inclined such that the preparations move from the first conveying part to the second conveying part at a second delivery position, the first conveying part comprises an upper end surface of the first circumferential wall, a radially outer side of the first circumferential wall being covered by an inner wall surface of the second circumferential wall, and the second conveying part comprises a cut part having a shape obtained by circumferentially cutting off a radially inner side of an upper end surface of the second circumferential wall.

2. The aligning and conveying apparatus according to claim 1, further comprising a suction roller for adsorbing the preparations conveyed by the second conveying part onto an outer circumferential surface and rotationally conveying the preparations.

3. The aligning and conveying apparatus according to claim 2, wherein the second ring is disposed such that the rotational axis extends vertically, and the suction roller is disposed such that the rotational axis extends substantially horizontally.

4. The aligning and conveying apparatus according to claim 2, wherein a cover for covering a more upstream side in a rotational direction of the second ring than the suction roller is securely provided above the second conveying part.

5. The aligning and conveying apparatus according to claim 1, wherein a rotational speed of the first ring is set so as to be higher than a rotational speed of the rotating disk and lower than a rotational speed of the second ring.

6. The aligning and conveying apparatus according to claim 1, wherein the first ring is composed of a plurality of concentrically disposed separate rings having separate circumferential walls, in the plurality of separate rings, respective rotational axes adjacent inside and outside are relatively inclined, and the first conveying part is composed of upper parts of the respective separate circumferential walls, the rotational axis of the radially innermost separate ring is inclined relative to the rotational axis of the rotating disk, and the rotational axis of the radially outermost separate ring is inclined relative to the rotational axis of the second ring.

7. The aligning and conveying apparatus according to claim 6, wherein rotational speeds of the plurality of separate rings are set so as to be increased from the innermost side toward the outermost side.

* * * * *